July 16, 1940.   V. E. MORRISON   2,208,384
SHIFT MECHANISM
Filed June 9, 1938   2 Sheets-Sheet 1
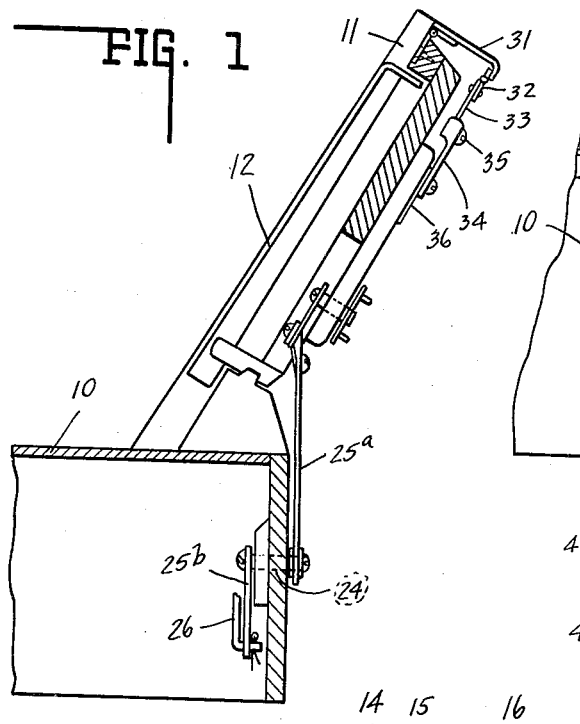
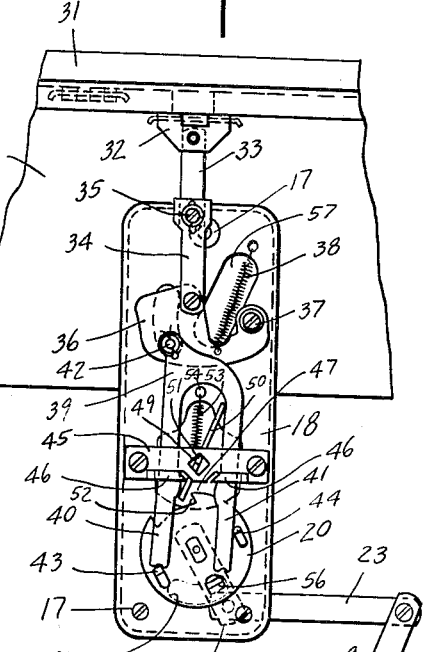
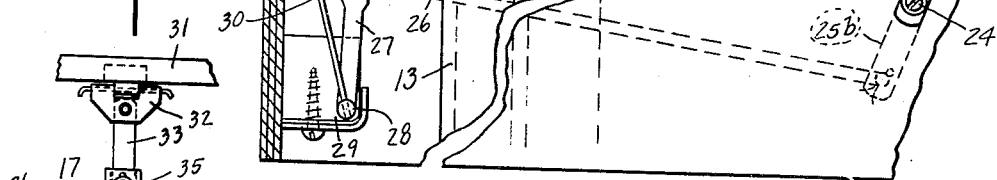
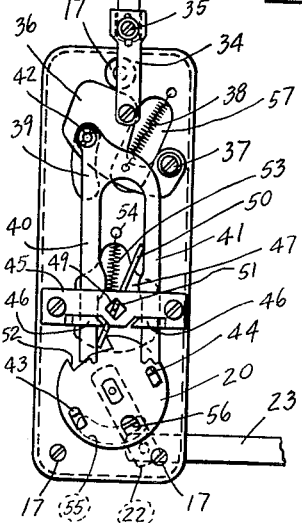
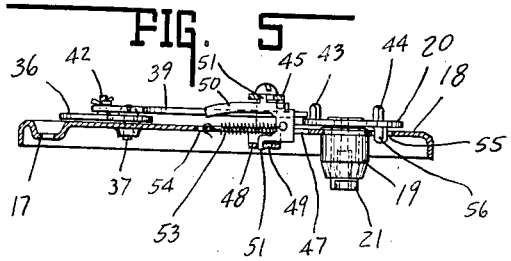
INVENTOR.
VAUGHN E. MORRISON.
BY Lockwood, Goldsmith & Galt
ATTORNEYS.

July 16, 1940.  V. E. MORRISON  2,208,384
SHIFT MECHANISM
Filed June 9, 1938　　2 Sheets-Sheet 2
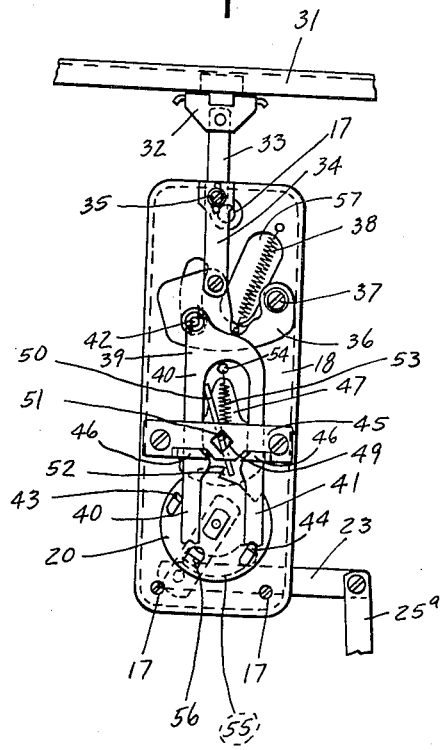
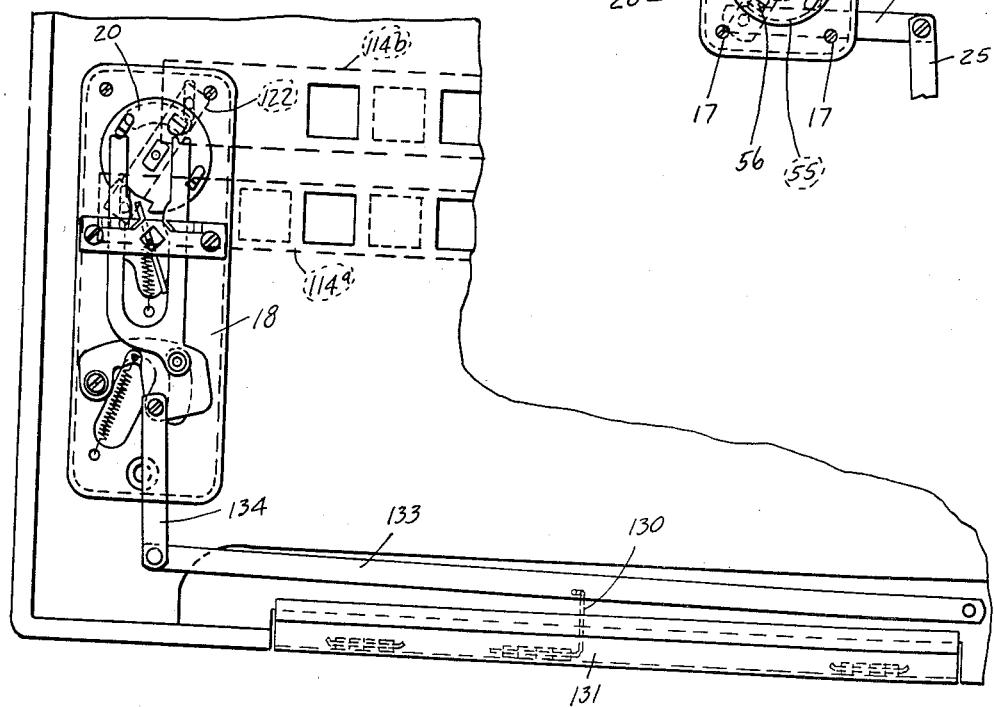
INVENTOR.
VAUGHN E. MORRISON.
BY Lockwood, Goldsmith & Galt,
ATTORNEYS.

Patented July 16, 1940

2,208,384

UNITED STATES PATENT OFFICE 2,208,384

SHIFT MECHANISM

Vaughn E. Morrison, St. Charles, Ill., assignor to The Rudolph Wurlitzer Company, Cincinnati, Ohio, a corporation Application June 9, 1938, Serial No. 212,677

5 Claims. (Cl. 74—110)

This invention relates to a shift mechanism applicable for various uses including accordions and similar musical instruments wherein there is employed a plurality of key operated valves for controlling the individual reeds of a reed block mounted in a wind box and a sliding auxiliary valve for rendering the entire series of reeds in the block effective or ineffective.

The object of this invention is to provide a shift mechanism applicable for such an instrument to control the position of the auxiliary slide valve or valves, in the manner well known and understood in the art, and wherein such shift mechanism is of exceptionally positive and rugged but simple construction convenient of manufacture and installation.

The invention will be more specifically set forth and described in the appended specification and claims.

The full nature of the invention will be understood from the accompanying drawings and the following description and claims:

Fig. 1 is a section through a portion of the accordion treble box and keyboard illustrating the mounting of the shift mechanism thereon.

Fig. 2 is a diagrammatical illustration of the application of the shift mechanism to the slide valves showing a plan view of said mechanism when in closed position.

Fig. 3 is a plan view of the shift mechanism when in inactive position.

Fig. 4 is a plan view of the shift mechanism when in valve open position.

Fig. 5 is a central longitudinal section through the shift mechanism with parts in elevation and in the position shown in Fig. 3.

Fig. 6 illustrates said shift mechanism as applied to the bass section of the instrument.

In the drawings there is illustrated a shift mechanism as it may be applied to an accordion or similar musical instrument having a treble wind box 10 with an angularly-disposed keyboard 11 mounting the usual series of piano keys 12 for individually controlling the respective valves of the reeds mounted in the wind box in the usual manner, said reeds being associated in a block indicated at 13 in a manner well known and understood in the art.

Each reed block is provided with a longitudinally sliding auxiliary valve 14 having a series of ports 15 adapted to register with corresponding ports in the reed block 13 and valve plate 16 when the slide valve is in open position, and be out of registry therewith so as to close the air passages through the reed block when in the opposite or closed position.

The shift mechanism for controlling the opening and closing of the sliding valve 14 in respect to the treble reed blocks is preferably secured to the underside of the keyboard 11 by means of the screws 17 and comprises a face plate 18 having a downwardly extending stud bearing 19. Rotatably mounted on the plate and supported within the bearing 19 there is an oscillating member herein shown as an actuating disk 20 having a stud 21 extending through the bearing and connected to an actuating arm 22. Said arm 22 is pivotally connected by a link 23 to a two piece lever fulcrumed to the wall of the wind box at 24, said lever comprising an outer section 25a pivotally connected to the link 23, and an inner section 25b pivoted to a connecting rod 26 extending along the side wall interiorly of the wind box. Thus, sections 25a and 25b form a rigid lever fulcrumed upon the wall of the wind box and connected by the fulcrum pin at 24 extending therethrough so that the section 25a is on the exterior of the wind box and the section 25b is within the interior thereof.

The connecting rod 26 is pivoted to an arm 27 which is secured to a rod 28 extending across one end of the wind box and mounted in suitable bearing brackets 29 to oscillate therein. Said rod is provided with one or more pins 30 extending radially therefrom into operative engagement with one end of a slide valve or valves 14.

From the foregoing it will be understood that the oscillatory movement of the actuating disk 20 will impart a reciprocating movement to the slide valve 14 through the connections above described, so that when the plate 20 is oscillated to the position shown in Fig. 2, the valve 14 will be moved to closed position. When the plate 20 is oscillated to the position shown in Fig. 4, the valve 14 will be moved to the right into open position.

For oscillating the plate 20 there is hinged along the outer edge of the keyboard 11 a shift key or push bar 31 which has a hinged connecting plate 32 to which a rigid strap 33 is secured. Said strap is adjustably and hingedly connected with a strap 34 through an adjusting screw 35. The strap 34 is pivotally connected to an actuating lever 36. Said lever is pivoted to the plate 18 at 37 so as to swing about said pivot upon actuation of the push bar 31 against the tension of a spring 38. For transmitting movement from the plate 36 to the actuating disk 20 there is provided a fork line pusher 39 having a pair of pusher arms 40 and 41. One end of the pusher is pivoted to the lever 36 at 42, the arms extending along the surface of the plate 18 in position to engage a corresponding pair of upstanding lugs 43 and 44, respectively.

Spanning the arms 40 and 41 there is a bridge plate 45 secured in spaced relation to the top surface of the plate 18 so that the arms pass between the plate 18 and the downwardly bent ears 46 formed from the bridge plate for slidably maintaining them in operative position.

The plate 18 is provided with an aperture 47 immediately below the bridge plate 45, which aperture is bisected by an underslung integral strap 48. Said strap 48 and bridge plate 45 are each provided with bearing apertures 49 in which a pusher shifting toggle arm 50 is fulcrumed through the medium of the projections 51 thereon. Said toggle arm lies in the plane of the arms 40 and 41 with which its ends engage to limit its swinging movement. Its forward end extends into alignment with a notch 52 formed in the peripheral edge of the actuating disk 20. Also a spring 53 has one end connected thereto forwardly of its fulcrum, the other end of the spring being secured to the plate 18 at 54. Thus, the spring 53 exerts a yielding pressure on the arm in one position or the other as it passes over center to bear against one or the other of the arms 40 or 41.

The plate 18 is provided with an arcuate opening 55 in which a downwardly extending lug 56 extends from the actuating disk so as to limit the oscillatory movement of said disk. Said plate 18 is further provided with an opening 57 to make room for the spring 38.

In operation, when the shift is at rest, as shown in Fig. 3, with the valve or valves closed, and it is desired to shift the valves to open position, the push bar 31 is pressed inwardly so as to cause the lever 36 to swing about its pivot and force the pusher forwardly to the position shown in Fig. 4. In this forward movement, the arm 40 will engage with the lug 43 to oscillate the disk 20 about its mounting, said disk acting through the linkage to slide the valve or valves to closed position.

As the disk is thereby oscillated, it is limited in its movement by the lug 56 and at the same time the toggle arm 50 is swung about its pivotal mounting over center from the position shown in Fig. 3 to that shown in Fig. 4. The disk having thus been moved to its new position, the push bar is released and the pusher will be returned by spring 38 to its normal position as shown in Fig. 3. When in this position, the toggle arm will exert pressure against the other arm 41 through the tension of spring 53. This pressure will shift the pusher to the other side, limited by the bridge 45, so that said arm will be in alignment with its corresponding lug 44 and the arm 40 will be out of alignment with lug 43. Thus, upon the pusher being again actuated, the arm 41 will engage lug 44 while arm 40 will slide past the lug 43, thereby oscillating disk 20 in the opposite direction.

As often as the pusher bar is pressed inwardly, the arms 40 and 41 will alternately engage their respective lugs 43 and 44 so as to oscillate the disk first in one direction and then the other, which movement will be correspondingly imparted to the slide valve or valves. Its engagement and actuation of first one lug and then the other is effected by the oscillating movement of the toggle arm 50, which acts to shift the arms in or out of alignment with their respective lugs.

As shown in Fig. 6, the shift mechanism indicated in outline by the plate 18 and oscillating disk 20 is mounted at one end of the bass section of the instrument. The disk is provided on its underside with a diametrically extending bar 122 in place of the bar 22 above described. The bar 122 has its opposite ends connected to the corresponding ends of the slide valves 114a and 114b. Said valves are so arranged that they are both open when the disk is oscillated to one position, and both closed when oscillated to the other position. In this arrangement, the push strap 134 takes the place of the above described strap 34 and has one end pivotally connected with the lever 133 which extends longitudinally of the wind box with its other end pivoted at 132. The push bar 131 is hingedly mounted to the wall of the box and is connected to the lever 133 intermediate its ends by the push rod 130. Thus, upon actuating the push bar 131 on the bass section, the lever 133 is moved about its pivotal mounting so as to actuate the shift through the push strap 134, as above described.

The invention claimed is:

1. A shift mechanism comprising a supporting plate, an oscillating member pivotally mounted thereon, means operatively connected with said member for imparting reciprocatory movement to a structure to be operated thereby, a substantially U-shaped pusher having spaced arms with their ends positioned to engage opposite sides of said member alternately for oscillating it first in one direction and then the other upon manual movement of said pusher in the same direction, and means controlled by the oscillation of said member for shifting said pusher when retracted from one side to the other relative thereto, whereby one of said arms will be brought into alignment for engaging said member while the other arm will be moved out of alignment so as not to engage therewith.

2. A shift mechanism comprising a supporting plate, an oscillating member pivotally mounted thereon, means operatively connected with said member for imparting reciprocatory movement to a structure to be operated, a manually actuated pusher supported on said plate movable to alternately engage opposite sides of said member for oscillating it first in one direction and then in the other, means for limiting the oscillatory movement of said member, and means controlled by the oscillatory movement of said member for shifting said pusher when restricted alternately from one side to the other relative to said member, whereby said pusher will be positioned to engage and move one side of said member while free from engagement with the other side thereof.

3. A shift mechanism comprising a supporting plate, an oscillating member pivotally mounted thereon, means operatively connected with said member to be actuated for imparting reciprocatory movement to a structure to be operated thereby, diametrically opposed fixed projections on said member, a manually actuated pusher having spaced arms, one of said arms normally being in alignment with one of said projections for engaging the same to push said member about its pivotal mounting and the other arm normally free from engagement with its corresponding projection so as to freely permit such oscillation of said member, and means actuated by the oscillation of said member for shifting said pusher upon each operation thereof to bring the other arm into alignment with its said corresponding projection while permitting the first-mentioned arm to be cleared of its corresponding projection, whereby said member will be oscillated in the opposite direction upon a repeated movement of said pusher.

4. A shift mechanism comprising a supporting plate, an oscillating member pivotally mounted thereon, means operatively connected with said member to be actuated for imparting reciprocatory movement to a structure to be operated thereby, diametrically opposed fixed projections on said member, a manually actuated pusher having spaced arms, one of said arms normally being in alignment with one of said projections for engaging the same to push said member about its pivotal mounting and the other arm normally free from engagement with its corresponding projection so as to freely permit such oscillation of said member, a toggle arm pivotally mounted to said plate intermediate the arms of said pusher extending into engagement with said member adapted to be moved by the oscillation thereof from one side to the other about its pivotal mounting, and a spring connected therewith for causing said arm to yieldingly bear against one or the other of said pusher arms for shifting them into and out of alignment with their corresponding projections on said member.

5. A shift mechanism comprising a supporting plate, an oscillating member pivotally mounted thereon, means operatively connected with said member for imparting reciprocatory movement to a structure to be operated thereby, a manually actuated pusher movable to alternately engage opposite sides of said member for oscillating it first in one direction and then the other, means on said plate for slidably maintaining said pusher in operative position, a crank arm pivotally mounted on said plate to which an actuated end of said pusher is pivotally connected, and a spring for returning said arm and pusher to inoperative position after each operation thereof.

VAUGHN E. MORRISON.